United States Patent [19]
Logan et al.

[11] Patent Number: 5,327,161
[45] Date of Patent: Jul. 5, 1994

[54] SYSTEM AND METHOD FOR EMULATING A MOUSE INPUT DEVICE WITH A TOUCHPAD INPUT DEVICE

[75] Inventors: James D. Logan, Windham, N.H.; Blair Evans, Idlewild, Mich.

[73] Assignee: Microtouch Systems, Inc., Methuen, Mass.

[21] Appl. No.: 780,446

[22] Filed: Oct. 21, 1991

Related U.S. Application Data

[63] Continuation of Ser. No. 391,482, Aug. 9, 1989, abandoned.

[51] Int. Cl.⁵ ............................................. G09G 3/02
[52] U.S. Cl. ................................... 345/157; 345/173
[58] Field of Search .............. 340/706, 707, 709, 710, 340/712, 724, 726; 341/20; 178/18, 19; 273/148 B, 438, 434, DIG. 28; 74/471 XY; 200/6 A

[56] References Cited

U.S. PATENT DOCUMENTS

| | | | |
|---|---|---|---|
| 4,071,691 | 1/1978 | Pepper . | |
| 4,129,747 | 12/1978 | Pepper . | |
| 4,148,014 | 4/1979 | Burson | 273/148 B |
| 4,198,539 | 4/1980 | Pepper . | |
| 4,293,734 | 10/1981 | Pepper . | |
| 4,302,011 | 11/1981 | Pepper . | |
| 4,313,113 | 11/1982 | Thornburg | 340/709 |
| 4,371,746 | 2/1983 | Pepper . | |
| 4,430,917 | 2/1984 | Pepper . | |
| 4,734,685 | 3/1988 | Watanable | 340/706 |
| 4,766,423 | 8/1988 | Ono et al. | 340/709 |

FOREIGN PATENT DOCUMENTS 2139762 12/1984 United Kingdom .

OTHER PUBLICATIONS

Foley et al; "Fundamentals of Interactive Computer Graphic"; Addison-Wesley Publishing Company; 1982; 80-83 and 212-215.

Primary Examiner—Alvin E. Oberley
Assistant Examiner—Chanh Nguyen
Attorney, Agent, or Firm—Joseph S. Iandiorio

[57] ABSTRACT

A system and method for emulating a mouse input device with a touchpad input device having a drag switch and touch device in which the direction of movement of the touch device across the touchpad surface is determined, a display cursor is caused to move in the same relative direction as the direction determined by the touch device, and the cursor movement is continued in that same relative direction either in or out of a drag mode, even after the touch device stops moving so as to allow the cursor to be moved a greater distance than the touch device.

38 Claims, 10 Drawing Sheets

SYSTEM AND METHOD FOR EMULATING A MOUSE INPUT DEVICE WITH A TOUCHPAD INPUT DEVICE

This is a continuation of application Ser. No. 07/391,482, filed Aug. 9, 1989, now abandoned.

FIELD OF INVENTION

This invention relates to a system and method for emulating a mouse input device with a touchpad input device and more particularly to such a system and method in which the display cursor may be moved long distances with the drag button up or down with but a single stroke of the touchpad.

BACKGROUND OF INVENTION

Touchpad input devices are small, touch-sensitive devices that can be used to replace the mouse cursor locator/input device in mouse-driven personal computers. The touchpad typically includes a small touch-sensitive screen anywhere from one by two inches up to three by five inches; the touchpad output is an analog signal representative of the location of the touching device on its surface. The computer system employs this information in placing the cursor on the CRT display. Touchpads may be used as absolute cursor location devices in which the cursor is placed in the same relative location as that of the touch device on the touchpad screen. When used as an absolute positioning device, however, the touchpads make precise cursor location difficult due to the small screen size.

Touchpads are more typically used as relative cursor positioning devices in which the cursor is moved across the display using one or more strokes of the touchpad surface; the cursor movement is related in some manner to the movement of the touchpad device across the surface. However, in order to move the cursor long distances, multiple strokes of the touchpad surface are required. In the smaller touchpads, the problems associated with multiple strokes are magnified due to the short maximum stroke distance.

Touchpad devices typically include a switch or "button" on the lower side of the pad which, when pressed, is used to emulate the selection function of the button on a mouse. When the operator desires to "drag" the cursor across the display, the button must be held down. When the cursor must be moved relatively long distances, necessitating multiple touchpad strokes, it is difficult or impossible to hold the drag button down to prevent release of the button and termination of the drag sequence while accomplishing the multiple strokes. If the finger is simply lifted from the screen, the drag sequence will terminate and must again be started. Even if the cursor can be dragged with a single touchpad stroke, it is extremely difficult to maintain sufficient pressure on the touchpad to hold the button down while sliding the finger across the touchpad surface. Consequently, in using touchpad devices for dragging, the drag sequences are frequently unintentionally terminated.

SUMMARY OF INVENTION

It is therefore an object of this invention to provide a system and method for emulating a mouse input device with a touchpad input device in which the cursor may be moved long distances with a single stroke.

It is a further object of this invention to provide such a system and method in which the cursor may be dragged long distances without holding the drag button down.

It is a further object of this invention to provide such a system and method in which the cursor may be dragged without maintaining finger contact with the touchpad device.

This invention results from the realization that relative positioning touchpad devices can be dramatically improved to allow long distance cursor movement in or out of drag mode by maintaining the cursor movement in the same relative direction as a touchpad stroke after the stroke is terminated.

This invention features a system and method for emulating a mouse input device with a touchpad input device in which the cursor movement continues after completion of a touchpad swipe whether in or out of the drag mode, to allow the cursor to be exactly and quickly positioned.

DISCLOSURE OF PREFERRED EMBODIMENT

Other objects, features and advantages will occur from the following description of a preferred embodiment and the accompanying drawings in which.

Figure 8:
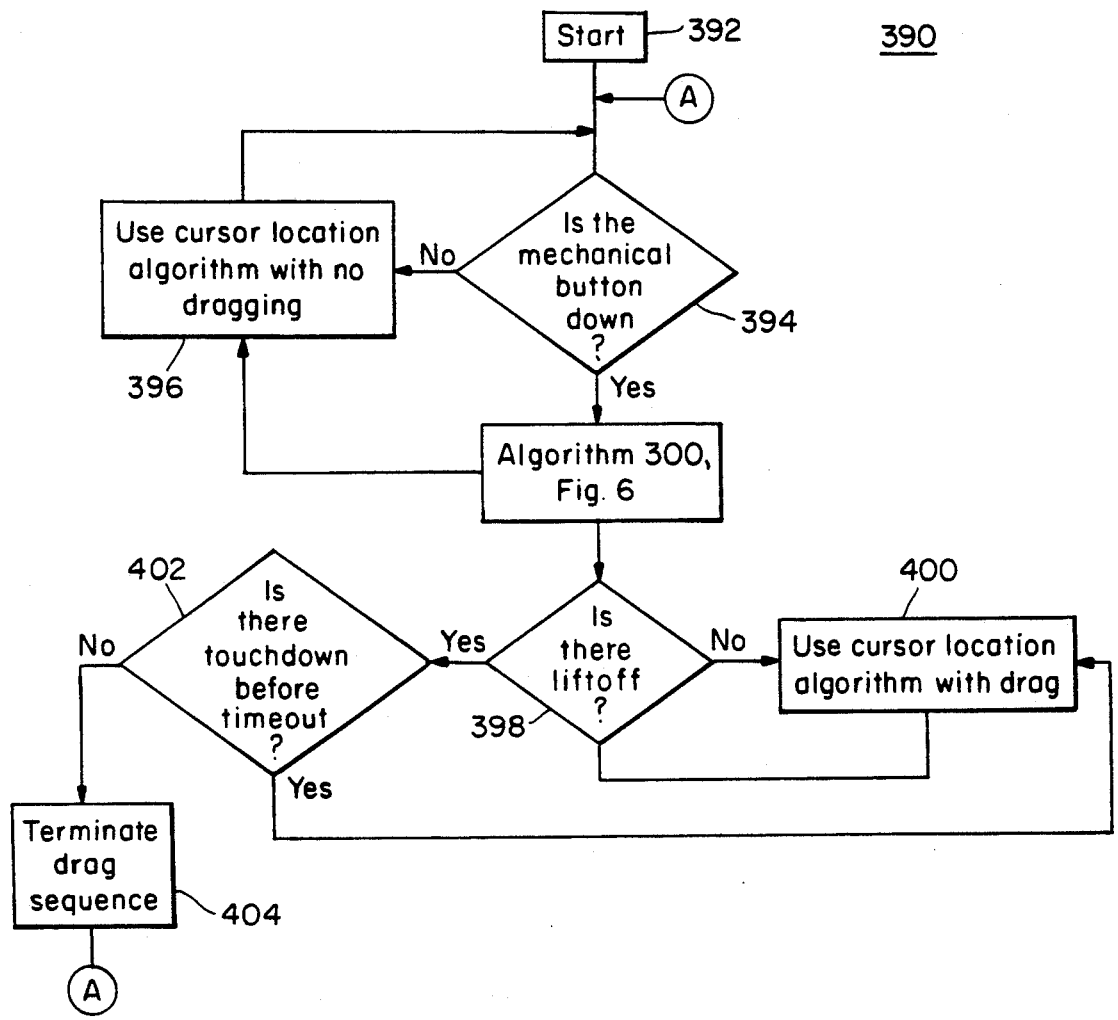
Figure 9:
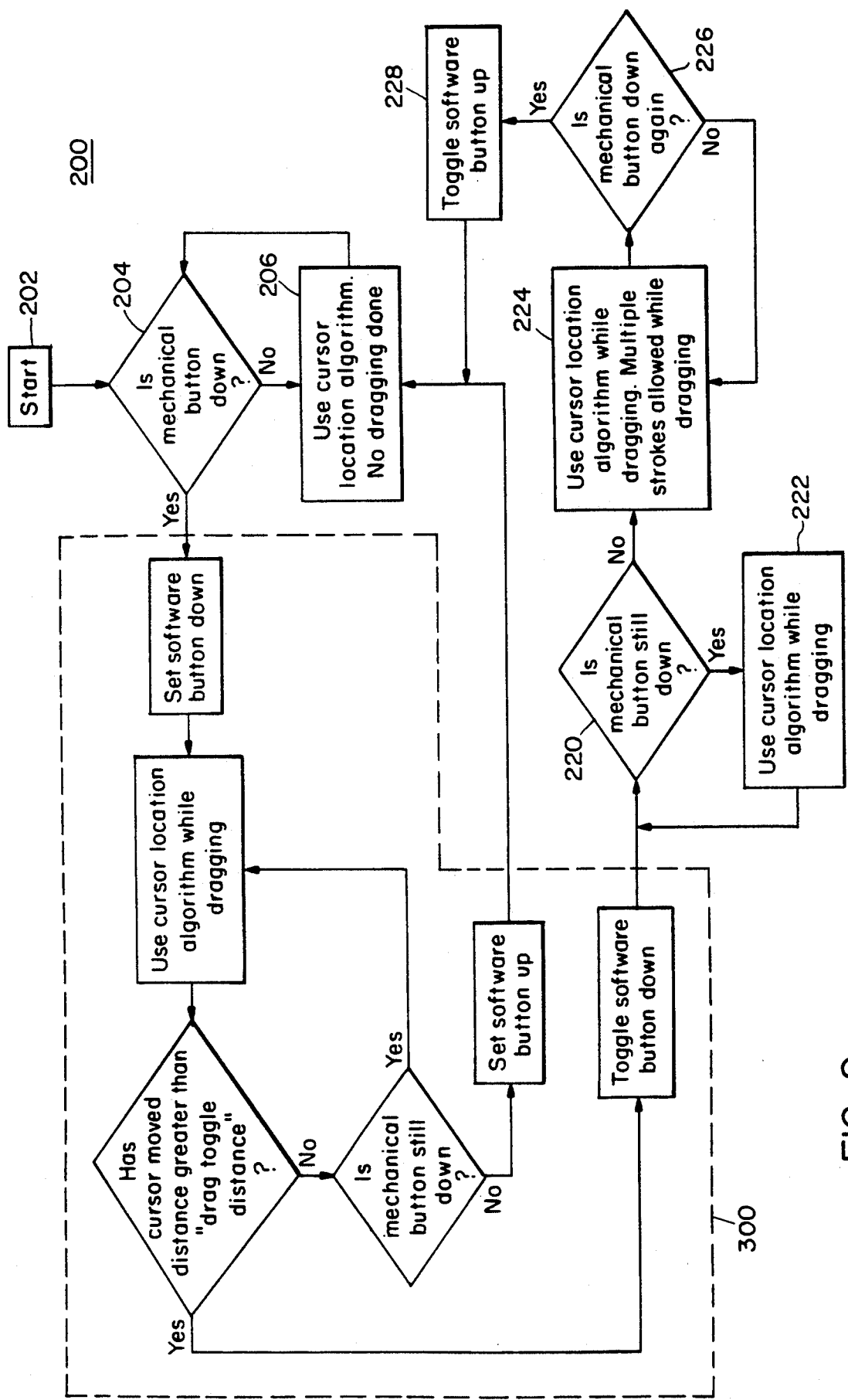

FIG. 8 is a flow chart of the portion of the mouse emulation system and method according to this invention in which the drag button is held down for a predetermined time after device liftoff; and FIG. 9 is a flow chart of the portion of the mouse emulation system and method according to this invention in which the drag button is toggled down after its release and toggles up when it is again pressed.

This invention may be accomplished in a mouse emulation system and method for use with a microcomputer employing a touchpad cursor location/input device. The system and method according to this invention provides for long-distance cursor movement in or out of the drag mode without the need for the multiple strokes required by the existing touchpad devices.

Figure 1A:
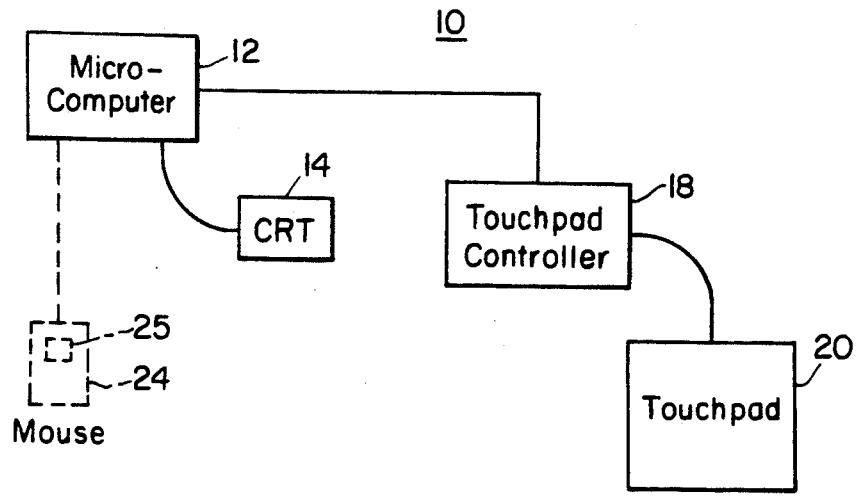
FIG. 1A is a hardware block diagram of a computer system employing a mouse-replacement touchpad for the system and method according to this invention.

There is shown in FIG. 1A microcomputer system 10 for use in the system and method according to this invention. Microcomputer system 10 includes microcomputer 12 with CRT 14, which together may be included in for example an Apple Macintosh SE. Touchpad 20 may be a capacitive-type touchpad of the type known in the art. These touchpads employ miniaturized touch screen technology, which is disclosed generally in U.S. Pat. Nos. 4,071,691; 4,129,747; 4,198,539; 4,293,734; 4,391,746; 4,302,011; and 4,430,917, all by Pepper, Jr., incorporated herein by reference. Touchpad controller 18 is the hardware interface between touchpad 20 and microcomputer 12.

Touchpad 20 is typically operated with a conductive device such as a stylus or finger. Touchpad 20 can be either a relative or absolute cursor movement device similar to mouse 24, which is the pointer/input device typically used in microcomputer systems. Mouse 24 has mouse button 25 for accomplishing mouse-controlled functions such as menu pull down and selection and icon selection and use, for example. Two and three button mice are also used; the second and third buttons have assigned functions chosen by the manufacturer. The nature of mice and the mice button(s) are well known to those skilled in the art.

Figure 1B:
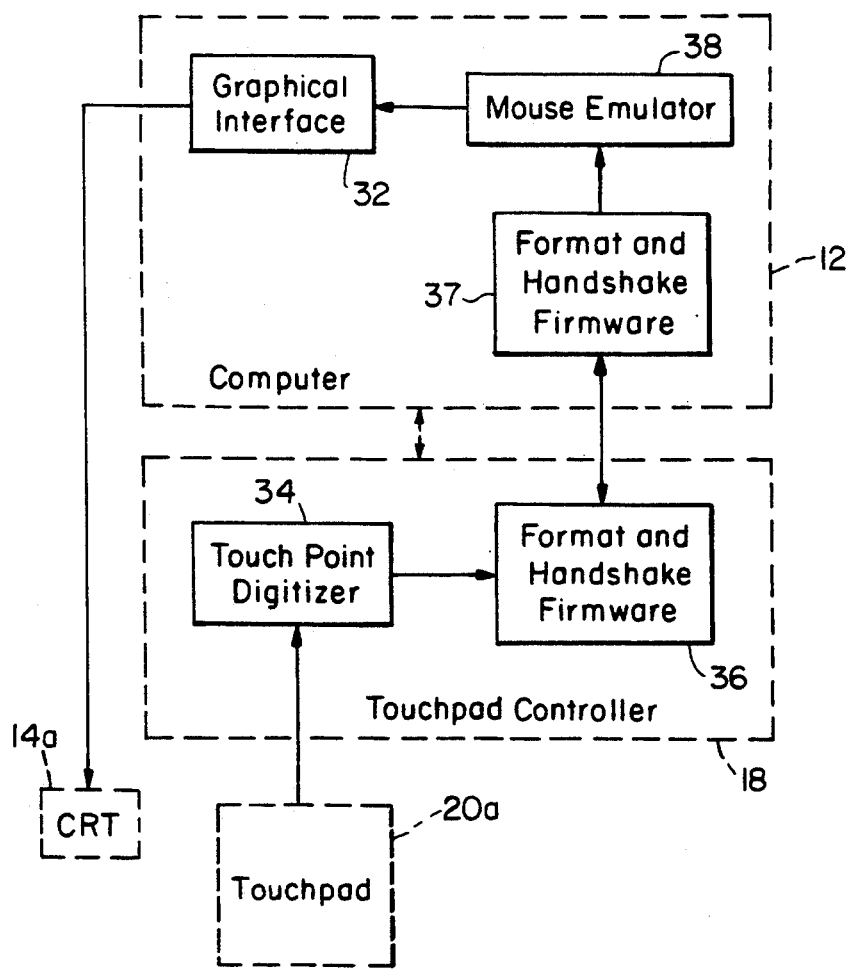
FIG. 1B is a block diagram of the software for the computer system of FIG. 1A including the mouse emulation system according to this invention.

FIG. 1B is a block diagram of the software for use in microcomputer system 10, FIG. 1A. Touchpad controller 18 includes touch point digitizer 34 for interpreting and digitizing the pad touches; the sensed voltages are converted to a digital representation of the X and Y points. Format and handshake firmware 36 is responsive to touch point digitizer 34 for interfacing with similar firmware 37 in computer 12. Computer 12 also includes mouse emulator 38 according to this invention and graphical interface 32 for interpreting cursor location and mouse button emulation signals. Touch point digitizer 34, format and handshake firmware 36, touchpad controller 18 and relative-positioning touchpad 20a are available from MicroTouch Systems, Inc., of Wilmington, Mass. Graphical interface 32 is resident in microcomputer 12 and visually presents through CRT 14a the operating system and applications, for example the windows and icons. Interface 32 interprets cursor position and mouse button signals from emulator 38, as will be described with more particularity below.

Figure 2A:
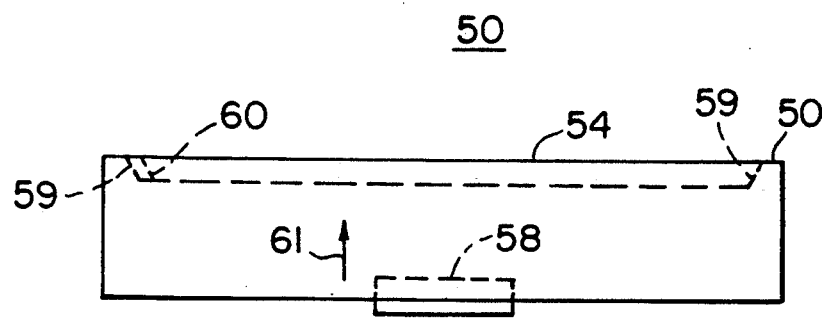
FIG. 2A is a schematic side elevational view of a touchpad input device illustrating a touch-sensitive bezel of the system and method according to this invention.
Figure 2B:
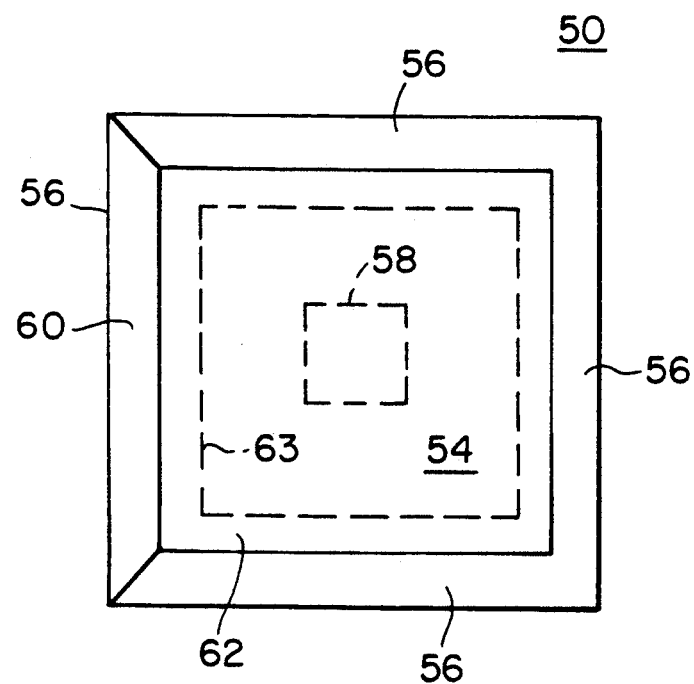
FIG. 2B is a schematic top plan view of the touchpad device of FIG. 2A illustrating the designated perimeter areas of the system and method according to this invention.

Touchpad device 50 for use in this invention is shown in FIGS. 2A and 2B. Device 50 typically includes on its upper surface touch-sensitive screen 54 inside of perimeter area surface 56 including bezel 59. The output of touchpad device 50 is typically an analog signal representative of the X and Y locations of the touch device contacting screen 54. Touchpad 50 may be either a relative or absolute cursor positioning device.

Touchpad 50 further includes drag button 58 for producing a signal to initiate and terminate the drag mode; the drag button and mode are well known to those skilled in the art. Switch 58 is typically a mechanical switch which moves in the direction of arrow 61 when screen 54 is pressed down. Thus, in order to initiate dragging, the operator simply presses on screen 54.

In existing touchpad devices, the system remains in drag mode only as long as switch 58 is closed. Thus, if the operator desires to drag the cursor across the CRT screen, he must drag his finger across screen 54 while maintaining sufficient force to close switch 58. This makes operation of touchpad device 50 in the drag mode somewhat awkward. Further, with a relative positioning touchpad device, if the operator desires to drag the cursor for a long distance across the screen, he must make multiple screen strokes. However, if the finger is lifted from screen 54, switch 58 will open and signal the system to leave the drag mode. Thus, in relative-positioning touchpad devices, dragging over long distances typically requires the operator to hold touchpad device 50 down on a table with one hand while stroking screen 54 with the other hand.

Two features of this invention which allow touchpad 50 to be more easily used in the drag mode are illustrated in FIGS. 2A and 2B. These will be described with particularity below. Touchscreen 54 may include designated perimeter area 62, defined by dashed line 63, for providing continued cursor movement even after the touch device stops moving. An alternative to designated perimeter 62 is touch-sensitive strip 60 mounted to bezel 59. The advantages of the strip over the designated area are that it takes no touchpad space and provides definitive tactile feedback exactly when the user has touched the "border" area. If employed in touchpad 50, touch-sensitive strip 60 would preferably cover all four bezel surfaces; strip 60 is shown covering only one bezel surface for purposes of illustration. Strip 60 may be a piezoelectric element or other touch-sensitive device known in the art which senses when the finger or touch device reaches the edge of screen 54. The signal from strip 60 is employed in maintaining cursor movement across the screen as is more fully described below in conjunction with FIGS. 3A, B and C.

Figure 3A:
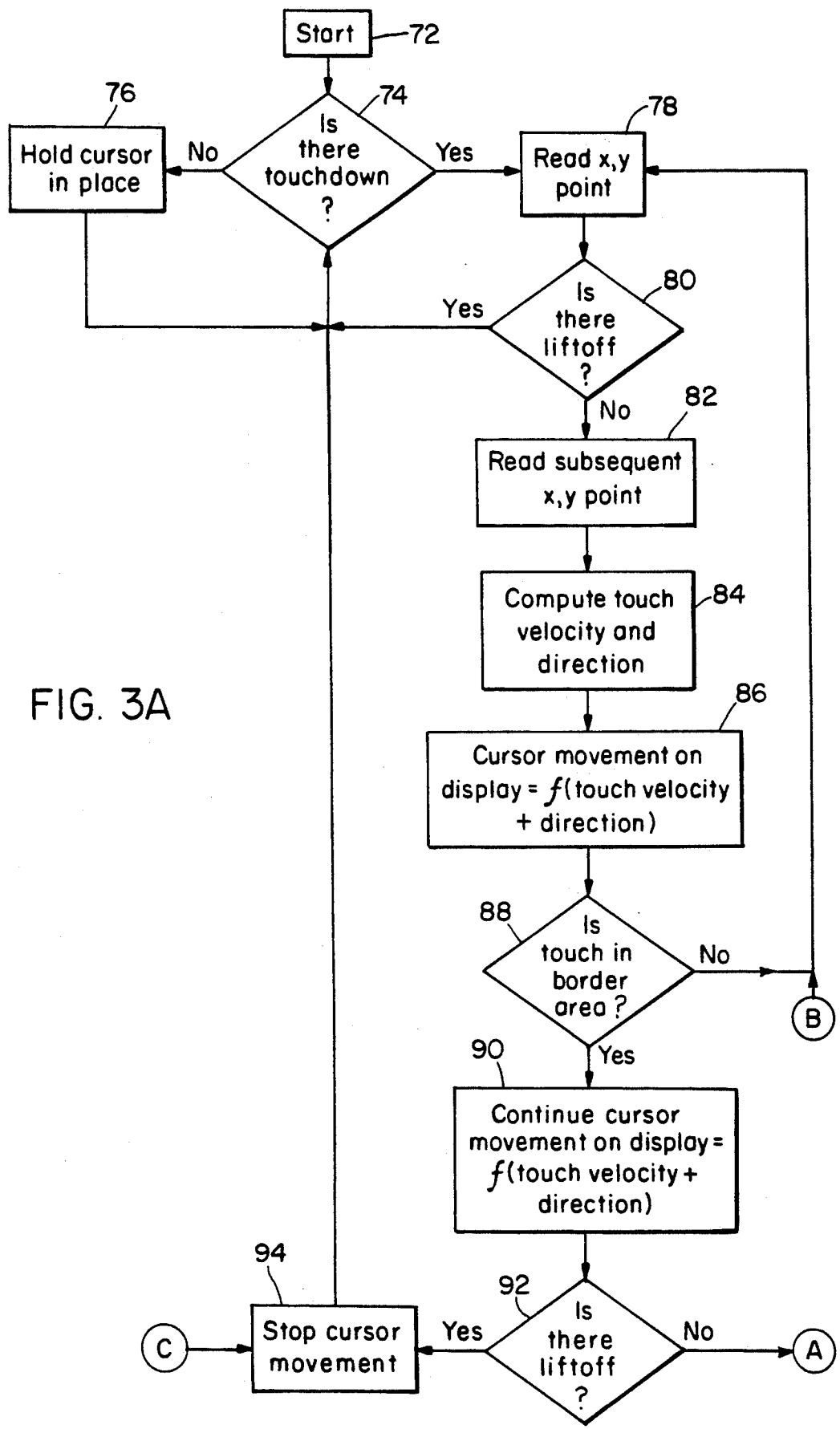
FIGS. 3A, 3B and 3C are flow charts of the portion of the mouse emulation system and method according to this invention for maintaining cursor travel after the touch device stops moving using the touchpad device of FIGS. 2A and 2B.
Figure 3B:
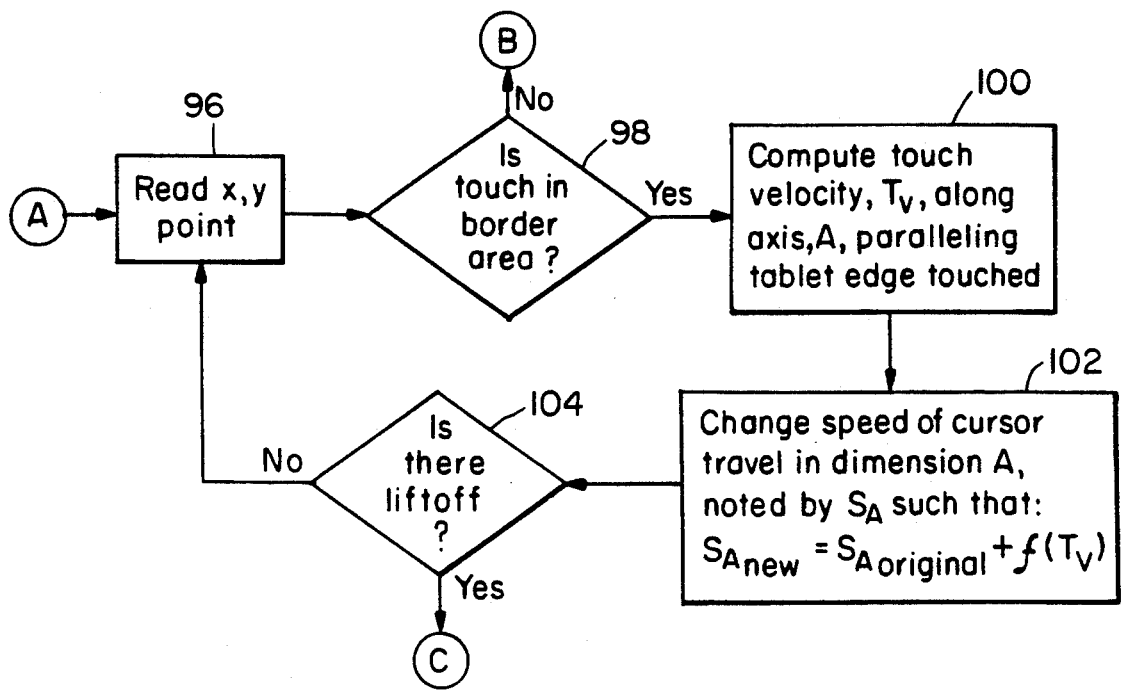

FIGS. 3A and 3B illustrate system 70 according to this invention for continuing cursor movement after the touch device stops moving across the touchpad surface. After the start, step 72, in steps 74 and 76 the cursor is held in place awaiting touch device touchdown. When touchdown occurs, the X, Y device location is read, step 78, and the cessation of screen contact, called liftoff, is monitored, step 80. If liftoff occurs, the operation is looped back to step 74.

If contact continues, subsequent X, Y points are read, step 82, and velocity and direction of movement of the touch device across the screen is computed, step 84. Since system 70 is employed in touchpads used as relative positioning devices, the computed finger direction is simply based on the initial and subsequent X and Y points; in relative positioning touchpads the cursor is moved across the screen in the same relative direction as the finger movement across the touchpad screen, as is known to those skilled in the art. The velocity is computed as a function of the change in distance over elapsed time.

Operation continues to step 86, in which the cursor movement is established as a function of the touch velocity and direction, described above. When the touch is in the touchpad border area, which may be either designated surface area 62, or the touch is in contact with touch-sensitive strip 60, FIGS. 2A and 2B, operation proceeds to step 90, in which the cursor movement is continued at the same speed and direction that it was traveling before the finger went into the border area. Thus, the operator may establish the direction and velocity of cursor movement with a short screen swipe ending in perimeter area 62 or in contact against bezel 59.

Border Designated perimeter area 62 may be established by creating a look-up table in which the touchpad screen locations corresponding to the border area reside. In that case, when the finger is in the border area, the cursor continues moving in the relative direction and velocity established by the finger movement before it entered the border area. Touch-sensitive strip 60 on bezel 59 is used in the same manner as border area 62, and has the advantage of allowing the entire touchpad screen to be used for cursor positioning.

If the touch device does not enter the border area, operation returns to step 78 for allowing the operator to alter the cursor direction and velocity by changing the direction and velocity of finger movement on the touchpad screen. If the touch is in the border area, operation proceeds to step 92, in which the system monitors for device liftoff. If liftoff occurs, cursor movement is stopped. Thus, to move the cursor across the screen, the operator may make a short swipe ending in the border area to establish cursor velocity and direction. The cursor will then continue moving in that direction at that velocity until the finger is lifted from the screen. Alternatively, the cursor control may be regained by simply sliding the finger back into the relative positioning screen area inside of perimeter area 62.

The continuing cursor movement is illustrated beginning in step 96, in which the X, Y finger touchpoint is read. If the touch is not in the border area, step 98, operation proceeds back to step 78. Steps 100 and 102 are preferably included in system 70; however, these steps are not necessary for accomplishing the continuing cursor movement described above. Steps 100 and 102 are added to allow the user to alter the cursor direction when in the border or perimeter area. This is accomplished by computing the finger velocity $T_v$ along axis A, which is parallel to the screen edge touched, step 100. In step 102, the velocity of cursor travel in direction A is changed as a function of the touch velocity $T_v$.

What steps 100 and 102 accomplish may be described as follows. System 70 imparts a direction and velocity to the cursor based on the finger direction and velocity. When the finger enters the border area, the system continues the cursor movement in that direction at that velocity until the finger is lifted from the screen. With the inclusion of steps 100 and 102, the user may slide his finger in a direction parallel to the screen edge while in the border area or against the touch-sensitive strip, whichever is appropriate, to change the direction of cursor movement. As an example, if the operator has established a cursor movement horizontally to the right by a horizontal screen stroke to the right ending in the border area or against the bezel, the user may impart a vertical component to the horizontal motion by sliding his finger up or down. In this example, dimension A would be the vertical or Y direction, and the velocity of cursor movement in that dimension would be changed from zero to some finite value related to the speed of finger movement in direction Y. Step 104 completes the cursor steering loop. The cursor movement is stopped, step 94, on lifting of the finger from the screen.

Figure 3C:
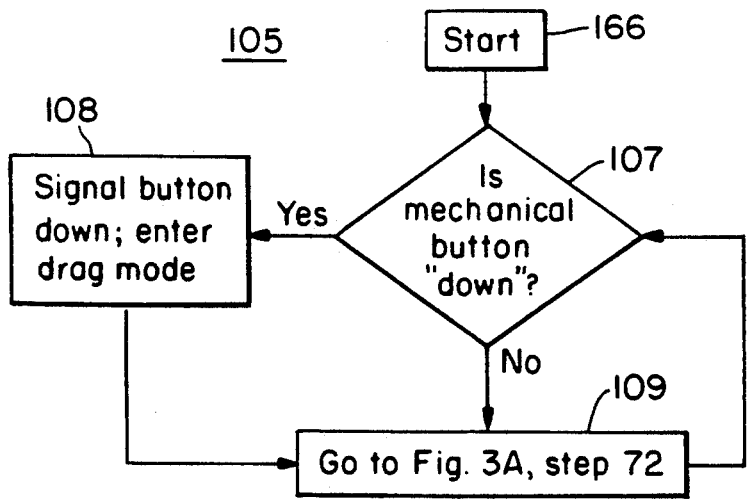

FIG. 3C illustrates a further system 105 according to this invention for operating system 70 in drag mode. In step 107, drag button 58, FIGS. 2A and 2B, is monitored. The mouse button drag mode is well known to those skilled in the art If the button is "down", or engaged, caused by sufficient pressure on the touchpad device, operation proceeds to step 108 in which the system provides a button down signal to graphical interface 32, FIG 1B. This signal causes interface 32 to begin operating in the drag mode, in which the cursor may be dragged across the display. Operation then proceeds to the start of system 70 for cursor location in the drag mode. If the drag button is not engaged, at step 109 operation proceeds to step 70 for cursor location, and the button monitor loop is completed through step 107. Thus, the system and method according to this invention provides for continuing cursor movement either in or out of the drag mode.

Figure 4:
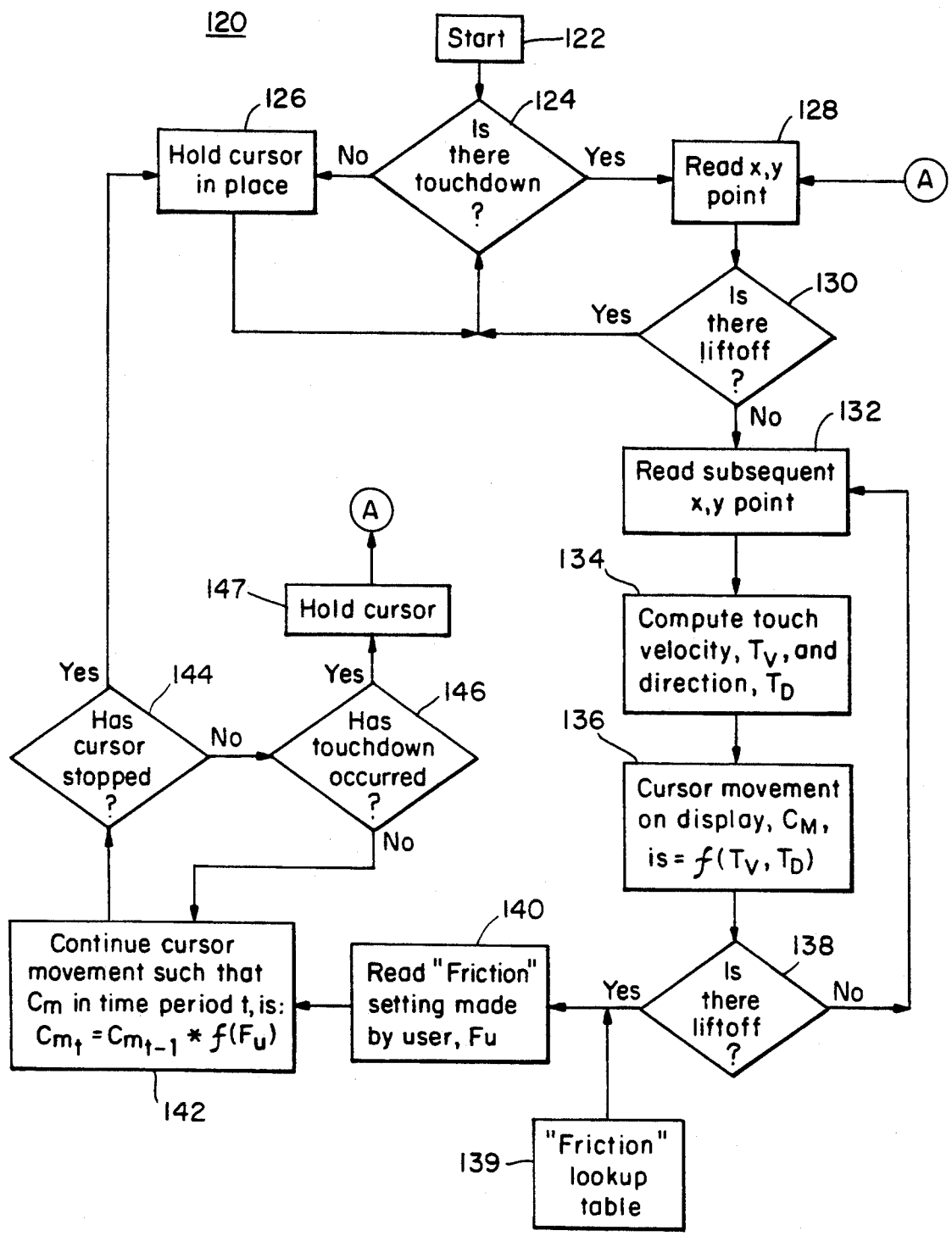
FIG. 4 is a flow chart of the portion of the mouse emulation system and method according to this invention in which the cursor continues moving across the screen even after touch device liftoff.

Algorithm 120, FIG. 4, illustrates the system and method according to this invention for providing cursor direction and velocity with a short swipe of the touchpad, such cursor motion continuing after liftoff, in which the overall cursor movement distance may be established by the user. In steps 124 and 126 the cursor is held in place until touchdown is sensed. In steps 128 and 130, the system monitors for continuing touch. When there is continuing touch and the operator's finger has moved, at step 132 the subsequent touch point is read and the touch velocity and direction are computed, step 134. In step 136, the system causes the cursor to move in a direction and velocity related to the touch direction and velocity; that operation is the same as that described in FIG. 3A.

When the device is lifted off, step 138, operation proceeds to step 140 in which the "friction" setting $F_u$ is read from lookup table 139. "Friction" is a term used to describe the cursor travel distance after liftoff in relation to touch velocity at liftoff. The concept is similar to creating a friction in the pad. When the friction is relatively high, the cursor will only slide a short distance after liftoff before coming to a halt. If the friction is set relatively low, the cursor will slide a long distance before coming to a halt. The "friction" setting, $F_u$, is simply a relative setting and may be established on a relative scale, for example, friction settings of 1 to 10. The operator may then choose a friction setting based on the operator's expertise and the amount of cursor movement which will be required in operating the program. The system interprets the friction setting and in effect establishes a total cursor movement distance after liftoff as a function of the velocity at liftoff and the friction setting. Thus, the effect of the "friction" starts on liftoff; before that, the cursor movers in a relative fashion. At step 142, the cursor velocity $Cm_t$ at time t, is established as a function of its velocity at an earlier moment, $Cm_{t-1}$, modified by the lost speed due to friction, shown as a function of $F_u$. The direction remains constant.

Operation proceeds to steps 144 and 146, in which the cursor movement and further device touchdown are monitored. If the cursor is moving and a second touchdown occurs, the cursor is stopped, step 147, and operation proceeds to step 128. Thus, the user may stop his "throw" of the cursor simply by tapping the screen. If the screen is not touched again, the system loops back through step 142 to continue the slow-down and eventual halt of the cursor. The result of steps 142, 144 and 146 is to slow and halt the cursor over a period of time related to the friction factor. Thus, the overall "throw"

of the cursor is related to finger velocity at liftoff and factor $F_u$.

System 120 emulates a cursor positioning device called a trackball. The trackball is a device known in the art which employs a rotatable sphere to drive the display cursor. The sphere is spun in a direction and velocity established by the user, and the cursor is moved across the display in the same relative direction at a velocity related to the spin of the ball. A trackball may be given a hard spin, and when released may spin on its own due to its large mass. The ball eventually slows and stops due to its friction. The effect of system 120 is to emulate a trackball in that in both cases the cursor continues to move after liftoff from the input device, and eventually halts of its own accord.

Figure 5:
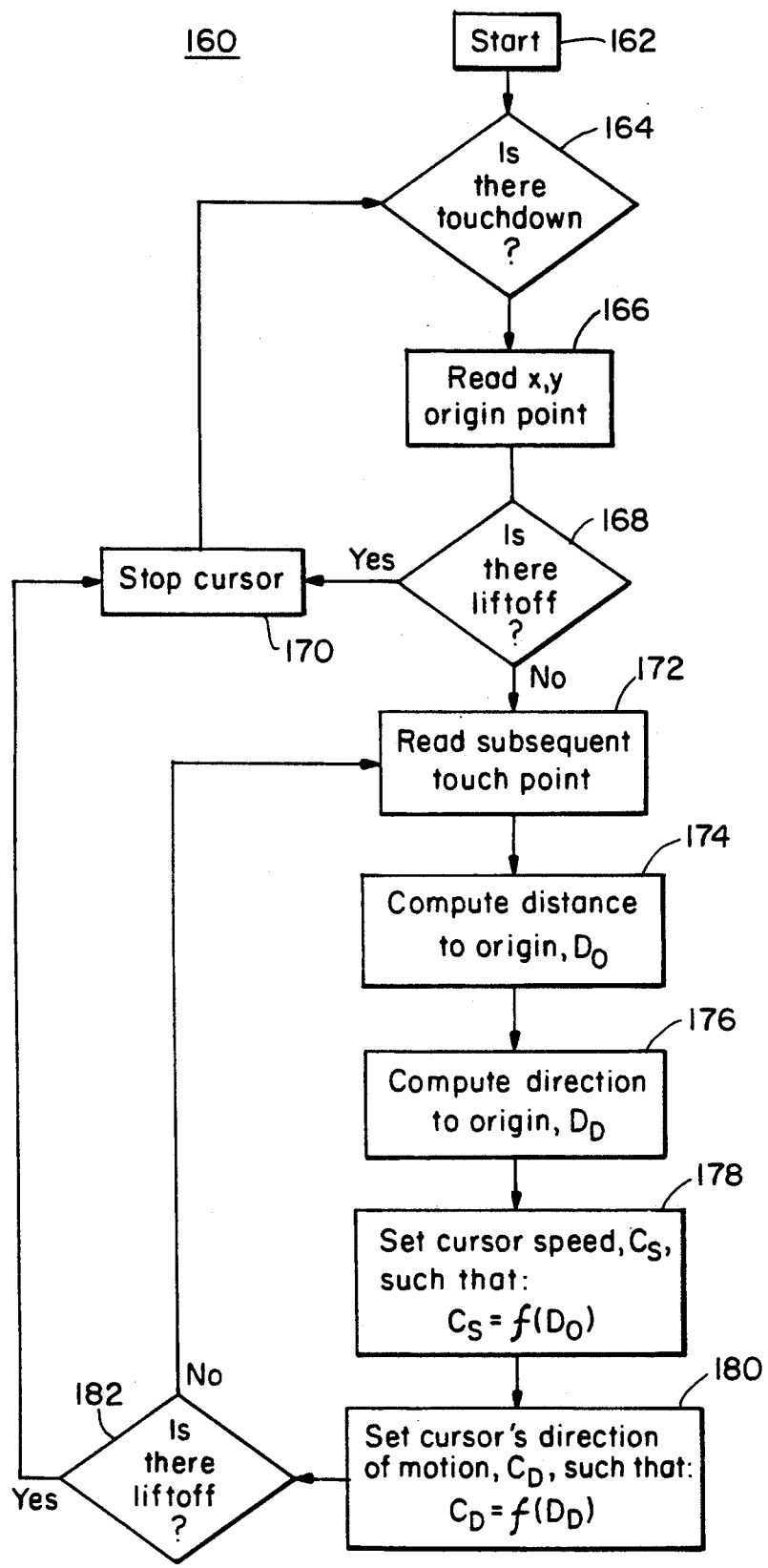
FIG. 5 is a flow chart of the portion of the mouse emulation system and method according to this invention in which the cursor velocity is proportional to the distance of touch device movement.

FIG. 5 illustrates an alternative system and method according to this invention for moving the display cursor without performing the multiple strokes. After the start, step 162, a touchdown is monitored and the X-Y point read, steps 164 and 166. If liftoff occurs, step 168, the cursor is stopped, step 170, and operation returns to step 164. If liftoff does not occur, operation proceeds to step 172 in which a subsequent touch point is read. In steps 174 and 176 the distance and direction from the subsequent touch point to the origin or original touch point are computed. The cursor speed is set, step 178, as a function of the distance. Thus, when the user moves his finger on the pad, the cursor goes forward on the display at a rate which is proportional to the distance from the resting location or origin. In step 180, the cursor direction is set as a function of the direction of the finger movement to cause the cursor to move in the same relative direction as the finger. Liftoff is monitored, step 182, and if there is continuing contact the program continues at step 172. This loop provides the operator with the ability to alter the device direction and/or speed by moving his finger without lifting off from the screen. As an example, pulling the finger back towards the resting location or origin will reduce the cursor speed. Lifting off the pad returns the cursor to the resting position, step 170, and operation proceeds back to step 164 for monitoring of another touchdown.

The operation of system 160 may be likened to a joy stick device. Wherever the user touches down on the touchpad screen, the system defines the position as the equivalent of the resting position for the joy stick. When the user moves his finger on the pad, the cursor moves in a direction that corresponds to the direction the finger has moved relative to the resting location, at a rate which is proportional to the distance from the resting location, to simulate the operation of a joy stick.

Figure 6:
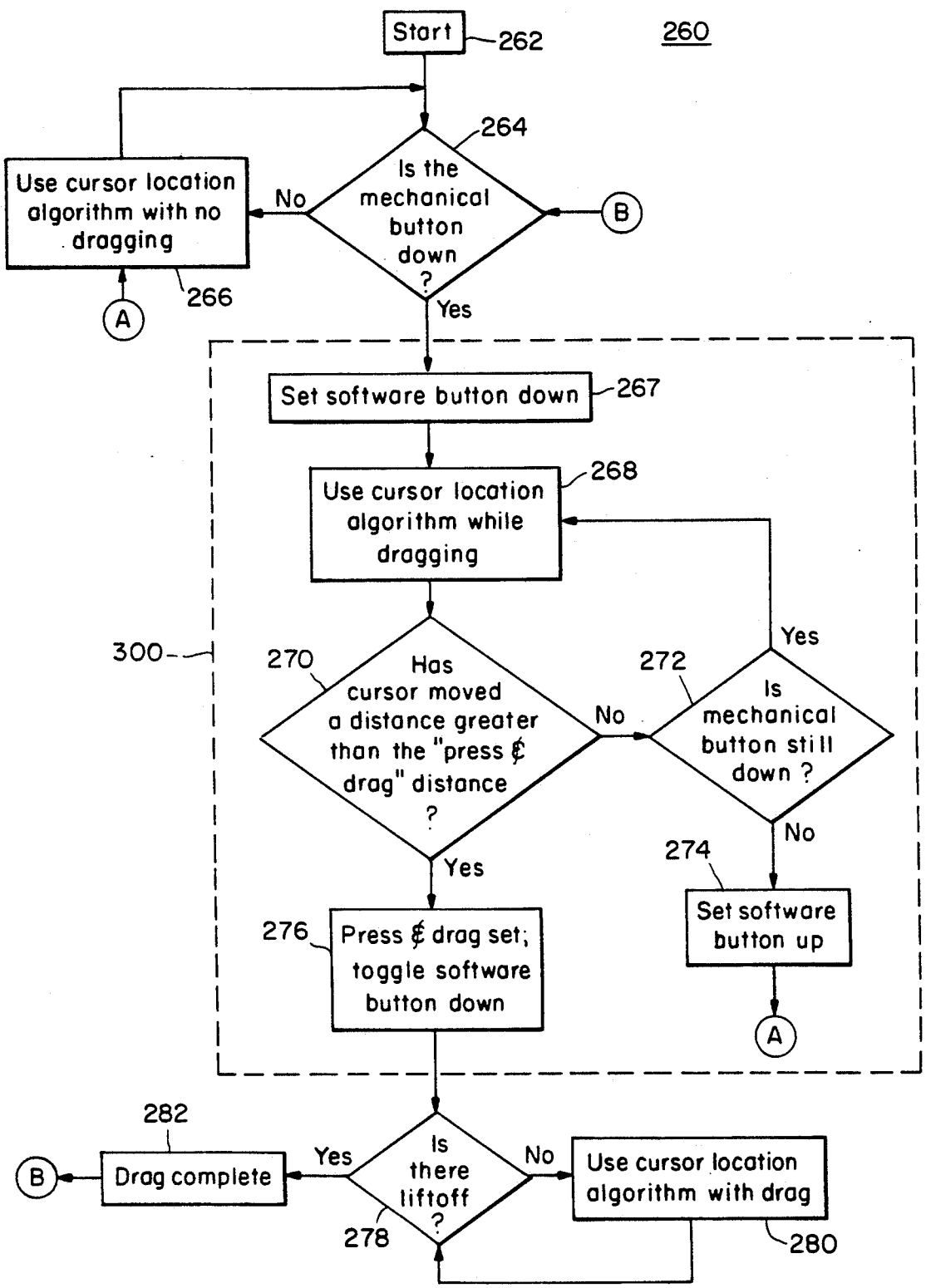
FIG. 6 is a flow chart of the portion of the mouse emulation system and method according to this invention in which the touchpad drag button is held in the down position after the mechanical button has been lifted.

FIG. 6 discloses system and method 260 according to this invention which encompasses maintaining the drag mode after the mechanical drag button is lifted. This allows the operator to slide his finger along the touchpad surface to move the cursor without having to maintain sufficient pressure to keep closed the mechanical drag switch.

After starting, step 262, operation proceeds to step 264 in which the mechanical drag button is monitored for closure (the down position). If the button remains up, operation proceeds to step 266, in which the touchpad would be used in a normal manner for cursor positioning. When the user desires to enter the drag mode, he presses the touchpad with sufficient force to close the mechanical drag switch. Operation then proceeds into algorithm 300, which encompasses a series of operations in which the mechanical drag button down position is emulated and maintained even after the drag button has been released. This allows the operator to move the cursor by sliding his finger across the touchpad surface without maintaining the force required to close the drag switch.

Algorithm 300 includes first step 267 in which a "button down" position is set to begin the drag mode. This "button down" position may be accomplished by providing an equivalent mouse button down signal to graphical interface 32, FIG. 1B. Operation then proceeds to step 268, in which the normal cursor location algorithm is employed to move the cursor in response to finger movements. The cursor location algorithm may be any of the cursor location algorithms known in the art.

In step 270, the cursor movement is monitored. When the cursor has moved more than a predetermined distance, called the "press and drag" distance, operation proceeds to step 276, in which the button down signal is toggled. This is the equivalent of toggling the mechanical drag switch, and results in the provision of a drag button down signal, which maintains the drag mode. After the button is toggled, operation leaves algorithm 300 and proceeds to step 278, in which liftoff is monitored. When liftoff occurs, the button toggle is released to complete the drag sequence, step 282, and operation returns to step 264. If there is no liftoff, operation proceeds to step 280, in which the cursor location algorithm described above is employed in the drag mode to allow the cursor to be positioned where desired.

If the cursor has not moved at least the "press and drag" distance, operation proceeds to step 272, in which the mechanical drag button is monitored. If the drag button is no longer closed, at step 274 the button down signal is terminated. Operation then proceeds to step 266 for cursor location. If the mechanical button is still down, operation proceeds to step 268 to complete the cursor distance monitoring loop.

System and method 260 provides the effect of automatic mechanical toggling of the drag button when the button is held closed while the finger is moved at least a predetermined "press and drag" distance. The press and drag distance may be chosen by one skilled in the art, and is preferably a relatively small distance to provide ease of operation, but should be large enough to allow the operator to jiggle or move his finger slightly without causing the drag button to toggle.

Figure 7:
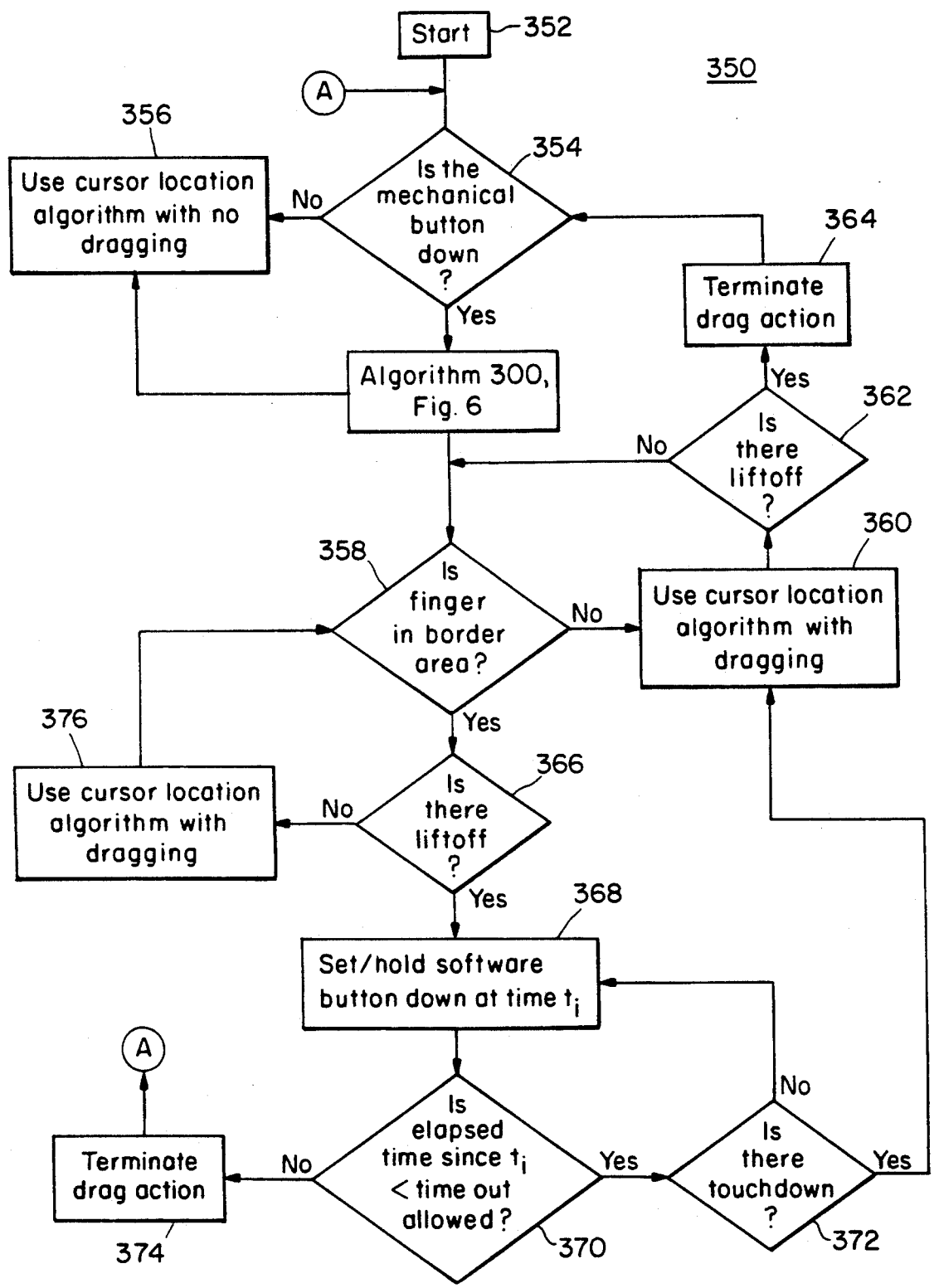
FIG. 7 is a flow chart of the portion of the mouse emulation system and method according to this invention in which the drag button is held down for a predetermined time after device liftoff from a border area.

Algorithm 300, which accomplishes the toggling of the drag button, is employed in the remainder of the figures, FIGS. 7-9. System and method 350 according to this invention, FIG. 7, allows the user to drag the cursor until his finger reaches the edge of the touchpad, and then holds the drag button down for enough time to allow the user to lift his finger from the screen and reposition it to continue cursor movement. In steps 354 and 356, if the mechanical drag button is up, the cursor may be located using the previously described algorithms. When the cursor button is down, operation proceeds to algorithm 300.

Operation then proceeds to step 358, in which the position of the finger is monitored for entry into a border area, which may be the same as area 62, FIG. 2B. This embodiment may also be used with the touch sensitive strip such as strip 60, FIG. 2A, for detection of the finger reaching the edge of the touchpad screen.

If the finger is in the border or edge area, liftoff is monitored, step 366, and if the finger remains in contact the cursor location algorithms described above are employed to move the cursor while maintaining the drag mode. Operation then returns to step 358 for completion of the monitoring loop. If the finger has not yet entered the border area, at step 360 the cursor location algorithm is employed with the drag mode maintained, and liftoff is monitored, step 362. If liftoff occurs, the drag action is terminated, step 364, and operation returns to step 354. The finger in border area/liftoff monitoring loop is completed by proceeding from step 362 to step 358 when liftoff has not been detected. Thus, the cursor location algorithms are used with dragging whether or not the finger is in the border area.

If the finger is in the border area and there is liftoff, at step 368 the drag button is held down beginning at the liftoff time, $t_l$. The operator then has a predetermined time called the "time out" in which he must again touch the screen to remain in drag mode. This allows the operator to remain in drag mode and lift his finger from the screen border area and place it down in another location to allow the operator to position the cursor where desired. If the time out time has not expired, another touchdown is monitored, step 372. The monitoring loop is completed through step 368. If there is a second touchdown within the time out period, operation proceeds to step 360 for the continuation of the drag mode cursor location. When the time out expires, operation proceeds to step 374 for termination of drag action, and the algorithm is repeated.

An alternative to system and method 350 is system method 390, FIG. 8, in which the "time out" second touch time is used regardless of the finger location on liftoff. Steps 394, 396 and algorithm 300 are the familiar drag button monitoring loop for providing a drag button down when the drag button is held down and the finger moved at least a predetermined distance. Operation proceeds to steps 398 and 400 for a liftoff monitoring loop. When liftoff occurs, a second touchdown occurring before the expiration of the "time out" time is monitored. If there is a second touchdown, operation proceeds to step 400, which maintains operation in the drag mode. If a second touchdown within the time out time does not occur, the drag sequence is terminated, step 404, and operation proceeds to step 394.

System and method 200, FIG. 9, illustrates another embodiment of the drag button/cursor location algorithm of this invention. Here, after the drag button is toggled, it remains down until it is again physically pressed with enough force to close the mechanical switch. Thus, the operator may make as many strokes as desired in any screen location while in drag mode. To complete the drag sequence, the operator merely presses down on the pad with sufficient force to re-engage the switch.

After starting in step 202, operation proceeds to mechanical button monitoring loop, steps 204 and 206, which continue normal operation until the mechanical drag button is down. When the button is down operation proceeds to algorithm 300 for toggling the drag button, and continues at step 220 and 222, in which the cursor location algorithm may be used while the mechanical button is down. If the mechanical button is no longer down, at step 224 the cursor location algorithms may still be used as desired while the drag mode is maintained. There is no need for continuous touchpad contact. The mechanical drag button is monitored, step 226, and when it is again pressed down, the toggled switch is released to terminate the drag mode. Operation then proceeds to step 206.

The system and method according to this invention allow the operator to accomplish long distance cursor movement in or out of drag mode with a relative positioning touchpad device with a minimum number of pad strokes. Skilled operators can position the cursor with but a single stroke, and in situations in which the operators are not at sufficient skill level or precise cursor control is needed, the cursor location may be readily and exactly controlled with few finger movements.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of emulating a mouse input device with a touchpad input device, comprising:
    designating a touch sensitive border area on the touchpad input device;
    determining the direction of movement of a touch device across the surface of the touchpad input device;
    causing a display cursor to move in the same relative direction as the determined direction;
    sensing when the touch device stops moving in the determined direction in a touch sensitive area excluding the border area and in response stopping the display cursor movement to allow the cursor to be positioned where desired; and
    sensing when the touch device stops moving in the determined direction after entering the border area and in response continuing the cursor movement in the relative direction to allow the cursor to be moved a greater distance than the touch device.

2. The method of claim 1 in which determining the direction of movement includes designating an area of the border area in which the touch device must reside to determine the direction of movement.

3. The method of claim 2 in which the designated area is the touchpad perimeter.

4. The method of claim 3 further including stopping the cursor movement in the relative direction on removal of the touch device from the touchpad perimeter.

5. The method of claim 3 in which determining the direction of movement includes determining a change in direction of movement of the touch device in the touchpad perimeter.

6. The method of claim 5 in which causing the cursor to move includes causing the cursor to change direction in response to the determined change to maintain the cursor relative movement.

7. The method of claim 1 in which the touchpad input device includes a drag switch on its lower surface, the method further including:
    entering a drag mode only after at least the touchpad is pushed down with sufficient force to engage the drag switch;
    continuing in the drag mode for at least a predetermined time after the release of the sufficient force to allow the touch device to be repositioned on the touchpad without terminating the drag mode; and
    terminating the drag mode when the time elapsed after the touch device is lifted off the touchpad and before the touch device is repositioned on the touchpad exceeds said predetermined time.

8. The method of claim 7 in which continuing in the drag mode includes designating an area of the touchpad in which the touch device must reside when the force is released to continue the drag mode.

9. The method of claim 8 in which the designated area is the touchpad perimeter.

10. The method of claim 7 further including terminating the drag mode upon expiration of the predetermined time without the sufficient force being reapplied.

11. The method of claim 10 further including terminating the drag mode upon lifting of the touch device from the touchpad surface within the predetermined time.

12. The method of claim 7 in which the drag mode is entered only after the touch device moves across the touchpad surface at least a predetermined distance after the drag switch is engaged.

13. The method of claim 12 in which the drag mode is entered only if the sufficient force is maintained while the touch device is moving the predetermined distance.

14. A system for emulating a mouse input device using a touchpad input device, comprising:
means for designating a touch sensitive border area on the touchpad input device;
means for determining the direction of movement of a touch device across the surface of the touchpad input device;
means for causing the cursor to move in the same relative direction as the determined direction;
means for sensing when the touch device stops moving in the determined direction in a touch sensitive area excluding the border area and in response stopping the display cursor movement to allow the cursor to be positioned when desired; and
means for sensing when the touch device stops moving in the determined direction after entering the border area and in response continuing the cursor movement in the relative direction to allow the cursor to be moved a greater distance than the touch device.

15. The system of claim 14 in which said means for determining the direction of movement includes means for designating an area of the border area in which the touch device must reside to determined the direction of movement.

16. The system of claim 15 in which the designated area is the touchpad perimeter.

17. The system of claim 16 further including means for stopping the cursor movement in the relative direction on removal of the touch device from the touchpad perimeter.

18. The system of claim 16 in which said means for determining the direction of movement includes means for determining a change in direction of movement of the touch device in the touchpad perimeter.

19. The system of claim 18 in which said means for causing the cursor to move includes means for causing the cursor to change direction in response to the determined change to maintain the cursor relative movement.

20. The system of claim 14 further including: a drag switch on the lower surface of the touchpad input device;
means for determining when the drag switch is engaged;
means, responsive to said means for determining, for entering a drag mode only after the drag switch is engaged; and
means, responsive to said means for entering, for continuing in the drag mode for at least a predetermined time after the drag switch is no longer engaged to allow the touch device to be repositioned on the touchpad without terminating the drag mode; and
means, responsive to said means for entering, for terminating the drag mode when the time elapsed after the touch device is lifted off the touchpad and before the touch device is repositioned on the touchpad exceeds said predetermined time.

21. The system of claim 20 in which said means for continuing in the drag mode includes means for designating an area of the touchpad in which the touch device must reside when the drag switch is disengaged to continue the drag mode.

22. The system of claim 21 in which the designated area is the touchpad perimeter.

23. The system of claim 20 further including means for terminating the drag mode upon expiration of the predetermined time without the drag switch being reengaged.

24. The system of claim 23 further including means for terminating the drag mode upon lifting of the touch device from the touchpad surface within the predetermined time.

25. The system of claim 20 further including means for determining if the touch device has moved at least a predetermined distance across the touchpad after the drag switch is engaged.

26. The system of claim 25 in which said means for entering the drag mode is further responsive to said means for determining if the touch device has moved for entering the drag mode only after the touch device moves at least a predetermined distance across the touchpad surface after the drag switch is engaged.

27. The system of claim 26 further including means for establishing if the drag switch is engaged while the touch device is moving the predetermined distance.

28. The system of claim 27 in which said means for entering the drag mode is further responsive to said means for establishing for entering the drag mode only if the switch remains engaged while the touch device is moving the predetermined distance.

29. A system for emulating a trackball input device using a touchpad input device, comprising:
means for designating a touch sensitive border area on the touchpad input device;
means for determining the velocity and direction of movement of a touch device across the surface of the touchpad input device;
means for moving a display cursor in the same relative direction as the determined direction;
means for sensing when the touch device stops moving in the determined direction in a touch sensitive area excluding the border area and in response stopping the display cursor movement;
means for sensing when the touch device stops moving in the determined direction after entering the border area and in response continuing the cursor movement in the relative direction;
means for establishing or setting a friction factor prior to touchpad operation; and
means for establishing continuing cursor velocity after touch device leaves the touchpad as a function of determined velocity modified by the friction setting.

30. The system of claim 29 further including means for establishing a relationship between the distance moved by the cursor and the friction setting.

31. A system for emulating a joystick input device using a touchpad input device, comprising:

means for designating a touch sensitive border area on the touchpad input device;

means for determining the direction and relative displacement of a touch device across the surface of the touchpad input device;

means for moving the cursor in the same relative direction as the determined direction;

means for sensing when the touch device stops moving in the determined direction in a touch sensitive area excluding the border area and in response stopping the display cursor movement; and means for sensing when the touch device stops moving in the determined direction after entering the border area and in response continuing the cursor movement in the relative direction to allow the cursor to be moved a greater distance than the touch device.

32. The system of claim 31 in which the velocity is directly related to the determined relative displacement.

33. The system of claim 32 in which said means for moving the cursor at a velocity related to the determined relative displacement includes means for varying the cursor velocity in relation to variation of the determined relative displacement.

34. A method for emulating a trackball input device with a touchpad input device, comprising:

designating a touch sensitive border area on the touchpad input device;

determining the velocity and direction of movement of a touch device across the surface of the touchpad input device;

causing a display cursor to move in the same relative direction as the determined direction;

sensing when the touch device stops moving in the determined direction in a touch sensitive area excluding the border area and in response stopping the display cursor movement; and sensing when the touch device stops moving in the determined direction after entering the border area and in response continuing the cursor movement in the relative direction;

establishing or setting a friction factor prior to touchpad operation; and establishing continuing cursor velocity after touch device leaves the touchpad as a function of determined velocity modified by the friction setting.

35. The method of claim 34 further including establishing a relationship between the distance moved by the cursor and the friction setting.

36. A method for emulating a joystick input device with a touchpad input device, comprising:

designating a touch sensitive border area on the touchpad input device;

determining the direction and relative displacement of a touch device across the surface of the touchpad input device;

causing a display cursor to move in the same relative direction as the determined direction;

sensing when the touch device stops moving in the determined direction in a touch sensitive area excluding the border area and in response stopping the display cursor movement; and sensing when the touch device stops moving in the determined direction after entering the border area and in response continuing the cursor movement in the relative direction to allow the cursor to be moved a greater distance than the touch device.

37. The method of claim 36 in which the velocity is directly related to the determined relative displacement.

38. The method of claim 37 further including varying the cursor velocity in relation to variation of the determined relative displacement.

* * * * *